Oct. 7, 1969   R. E. MILEY   3,470,757
CONTROL LINKAGE FOR VARIABLE SPEED BELT DRIVE
Filed May 9, 1968
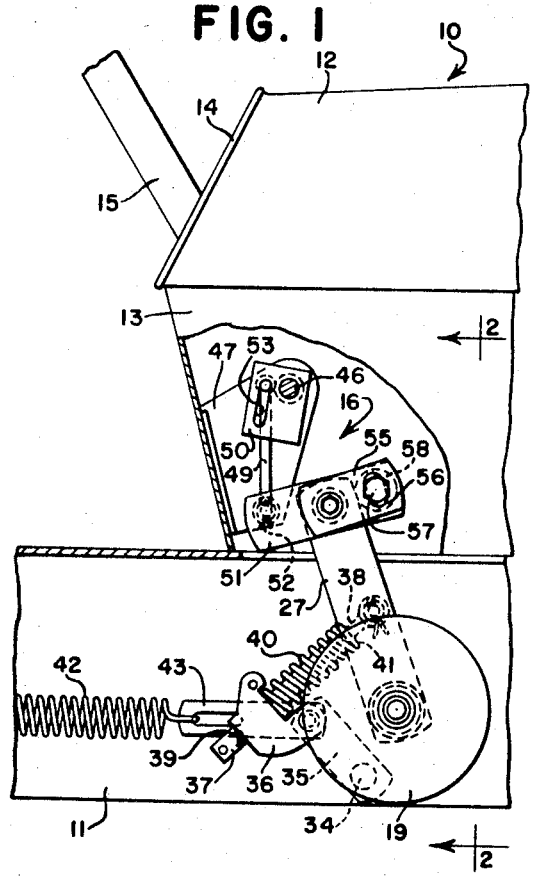
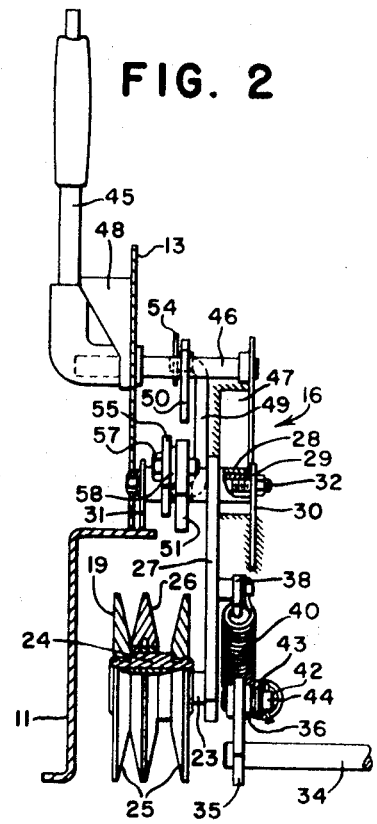
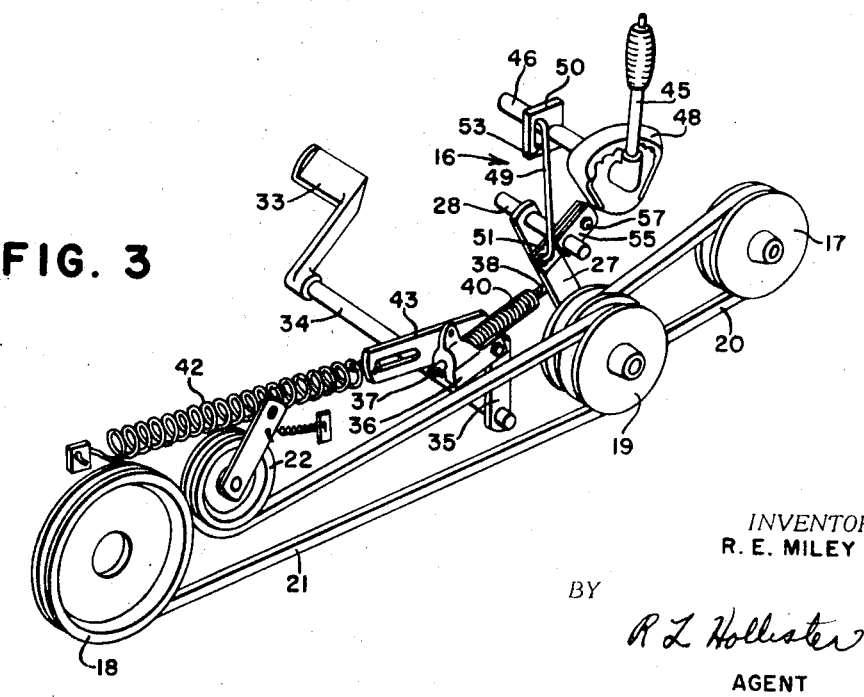
INVENTOR.
R. E. MILEY
BY
R L Hollister
AGENT United States Patent Office 3,470,757
Patented Oct. 7, 1969

3,470,757
CONTROL LINKAGE FOR VARIABLE SPEED BELT DRIVE
Richard Erwin Miley, Horicon, Wis., assignor to Deere & Company, Moline, Ill., a corporation of Delaware
Filed May 9, 1968, Ser. No. 727,807
Int. Cl. F16h 7/12, 55/52
U.S. Cl. 74—230.17                 6 Claims

ABSTRACT OF THE DISCLOSURE

A variable speed belt drive system which is optionally controlled by either a foot-operated clutch pedal or a hand-operated control lever. The linkage for the hand-operated lever is constructed such that it can be adjusted to compensate for belt elongation or wear by loosening a single cap screw.

BACKGROUND OF THE INVENTION

This invention relates to the control mechanism for a variable speed belt drive and more particularly to improved control linkage which provides a simple method of adjusting the linkage to compensate for belt elongation and wear.

In a variable speed belt drive system, it is necessary and customary to provide the control linkage with some means of adjustment to compensate for elongation or wear of the belt. Without some suitable adjustment, the degree of control available will decrease as the belt wears. If the amount of control initially available is limited, it may, due to belt wear, be lost entirely such that the belts will not transmit any power, but merely slip in the sheaves. In many uses of variable speed belt drives, the control initially available is limited. For example, if a vehicle such as a lawn and garden tractor is provided with a belt drive, it is customary to provide a hand-operated control lever to regulate the drive system and the control lever is movable only within the limits dictated by a control lever quadrant. Therefore, if the control linkage were not provided with an adjustment, the drive belt or belts would require frequent replacement in order to maintain full control of the variable speed drive system. However, due to the extreme compactness of lawn and garden tractors, access to the control linkage is very difficult and adjustment of the control linkage has heretofore required much time and patience.

SUMMARY OF THE INVENTION

The object of the present invention is to provide control linkage for a variable speed belt drive system in which the control linkage provides an improved and simplified method of adjustment to compensate for belt elongation and wear.

A further object of the present invention is to provide a variable speed belt drive system for a tractor, which system has improved control linkage and provides a simplified method of adjusting the linkage to designed specifications to compensate for belt elongation and wear.

Another object of the present invention is to provide control linkage for a variable speed belt drive system and in which the control linkage can be adjusted to compensate for belt elongation and wear within a minimum of time and with a minimum of effort.

Still another object of the present invention is to provide improved control linkage for a variable speed belt drive system and in which the control linkage is easily adjustable even under the most limited space conditions.

The above objects are accomplished by providing a double rockshaft arrangement with one shaft regulating the drive system and the other shaft being manually operable and controlling the movement of the first shaft. The shafts are connected together by a rigid link extending between crank arms mounted on the shafts. The crank arm on one shaft is rotatably, adjustably mounted on the shaft and held in any adjusted position by a single cap screw. When adjustment is required, the single cap screw can be loosened, one shaft rotated with respect to the other to achieve the proper adjustment, and the cap screw tightened to hold the shafts in their adjusted relationship.

The above objects of the present invention along with the details of construction will become apparent from a reading of the following detailed description taken in conjunction with the accompanying drawings.

BRIEF DESCRIPTION OF THE DRAWINGS

In the drawings:
FIG. 1 is a side view of a portion of a tractor with the control linkage for a variable speed belt drive system constructed in accordance with the principles of the present invention incorporated therein, with parts in section and parts broken away to illustrate the control linkage;
FIG. 2 is a view taken substantially along the lines 2—2 of FIG. 1; and
FIG. 3 is a perspective view of a variable speed belt drive system and control linkage therefor which is constructed in accordance with the principles of the present invention.

DESCRIPTION OF THE PREFERRED EMBODIMENT

Referring to the drawing, a portion of a tractor is indicated generally at 10 and includes the conventional main frame members 11, hood 12, side walls 13, instrument panel 14 and steering column 15. As best illustrated in FIG. 2, the control linkage indicated generally at 16 is mounted between the side walls 13 and extends down between the main frame members 11.

The tractor drive train includes an input sheave 17 which is mounted on the crank shaft of the tractor engine (not disclosed), an output sheave 18 mounted on the tractor transmission or differential (not disclosed), a variator sheave 19 mounted on the lower end of the control linkage 16, a primary belt 20 trained around the input sheave 17 and the variator sheave 19, and a secondary belt 21 trained around the output sheave 18 and the variator sheave 19. The secondary belt 21 is maintained in constant tension by a spring loaded idler sheave 22. The variator sheave 19 takes the form of a variable pitch double pulley, and includes a bearing and shaft assembly 23, a hub 24 rotatably mounted on the bearing and shaft assembly 23, a pair of spaced, beveled flanges 25 fixed to the hub 24 adjacent the outer ends thereof, and a shiftable beveled flange 26 mounted on the hub 24 between the fixed outer flanges 25. The bearing and shaft assembly 23 is secured to the lower end of a crank arm 27 which is integrally mounted on a rockshaft 28. If the rockshaft 28 is rotated to move the variator sheave 19 toward the output sheave 18, the primary belt 20 will be forced deeper into its respective groove in the variator sheave 19 forcing the shiftable flange 26 toward the secondary belt 21 and forces the second belt 21 higher in its respective groove in the variator sheave 19, thus increasing the speed of the output sheave 18 with respect to the speed of the input sheave 17. If the rockshaft 28 is rotated to move the variator sheave closer to the input sheave 17, the opposite sequence of events will occur and the speed of the output sheave 18 will decrease with respect to the speed of the input sheave 17.

The rockshaft 28 is rotatably mounted on a ferrule 29 which is secured in position between a pair of spaced brackets 30 and 31 by a bolt 32. The brackets 30 and 31 are mounted on any suitable portion of the tractor structure. The movements of the rockshaft 28 can be alternatively controlled in either one of two methods. The first is through a clutch assembly. The clutch assembly includes a clutch pedal 33 secured to one end of a second rockshaft 34, and a short crank arm 35 secured to the other end of the rockshaft 34. The crank arm 35 is connected to the crank arm 27 through an adjustable and yieldable link assembly which includes a guide 36 pivotally secured to the crank arm 35, a hollow rod 37 slidably received by the guide and a second rod 38 which is pivotally secured to the crank arm 27 and extends into the hollow rod 37. The rod 37 is provided with internal threads and the rod 38 is provided with cooperating threads so that the two rods can be threaded together and provide a means of adjustment. A pin 39 extends through the rod 37 adjacent one end thereof and limits the movement of the rod 37 within the guide 36 in one direction, and movement of the rod 37 within the guide 36 in the other direction is resisted by a spring 40 which acts between the guide 36 and an enlarged end 41 on the rod 37. The clutch assembly is biased to its fully engaged position, that is the position it assumes when the variator sheave 19 is moved toward the output sheave, by a spring 42. One end of the spring 42 is secured to any suitable portion of the tractor structure while the other end of the spring 42 is secured to a link 43 which in turn is pivotally attached to the crank arm 35. The link 43 and the guide 36 are attached to the crank arm 35 by a common pin 44.

The second method of controlling the movement of the rockshaft 28 is through a hand-operated speed control lever 45. The lever 45 is secured to one end portion of a third rockshaft 46 which is journaled in one side wall 13 and a bracket 47 which is mounted on any suitable portion of the tractor structure. A quadrant 48 is secured to the outer surface of the wall 13 and limits the movement of a lever 45. The lever 45 can be provided with a spring loaded detent which cooperates with notches on the quadrant 48 to retain the lever 45 in any adjusted position. A rigid link 49 extends between a crank arm 50 which is secured to the shaft 46 and one end of a link 51 which is rotatably mounted on the shaft 28. The link 49 is constructed from a rod and has its end portions bent at a 90° angle with respect to the major link of the rod. One end of the link 49 extends through an opening provided in the end portion of the link 51 and is retained therein by a key 52 which extends through a suitable opening provided in the link 49. The other end of the link 49 extends through an elongated opening 53 provided in the crank arm 50 and is retained therein by a key 54. The elongated opening 53 forms a lost motion connection between the crank arm 50 and the link 49, the purpose of which will be explained in the description of the operation. An additional crank arm 55 is integrally secured to the shaft 28 and is provided with an elongated slot 56 adjacent its free end as illustrated in FIG. 1. The slot 56 is positioned with its major dimension generally perpendicular to the longitudinal axis of the crank arm 55. A cap screw 57 extends through elongated slot 56 and into a threaded opening provided in one end of the link 51. A suitable lock washer 58 is positioned between the crank arm 55 and the link 51. When the cap screw 57 is loosened, the link 51 is free to rotate with respect to the crank arm 55 within the limits of a slot 56. When the cap screw 57 is tightened, any movement of the link 51 will be transmitted through the crank arm 55 to the shaft 28.

The above described variable speed belt drive system operates as follows. When the variable speed control lever 45 is moved toward the rear position, the crank arm 50 will force the link 49 downwardly which in turn will rotate the shaft 28 through the link 51 and crank arm 55. When the shaft 28 is thus rotated, the variator sheave will be moved in the direction of the input sheave 17. As the variator sheave 19 is moved forwardly, the secondary belt 21 is forced deeper into the variator sheave and, due to the movement of the shiftable flange, the primary belt 20 is forced higher on the variator sheave, thereby decreasing the speed of the output sheave 18 with respect to the speed of the input sheave 17. When the variable speed control lever 45 is moved toward the forward position, the spring 42 will cause the variator sheave 19 to be moved toward the output sheave 18. This movement of the variator sheave forces the primary belt 20 deeper into the variator sheave and the secondary belt 21 is forced higher on the sheave, thereby causing the speed of the output sheave 18 to increase with respect to the speed of the input sheave 17. The lost motion connection between the crank arm 50 and the link 49 will allow movement of the clutch 33 to override the control lever 45. That is, when the control lever 45 is in its forward position, the speed of the output sheave 18 can be controlled by foot action on the clutch pedal 33. As the clutch 33 is depressed, the variator sheave 19 is moved forwardly to reduce the speed of the output sheave 18 with respect to the input sheave 17. Operation of the clutch pedal 33 does not in any way affect the control lever 45 because as the clutch pedal 33 is depressed the link 49 is free to move within the slot 53. However, when the clutch pedal 33 is not used, the link 49 is maintained in the upper end of the slot 53 by the spring 42 so that the variator sheave 19 is directly responsive to movements of the control lever 45.

When the primary belt 20 has worn to a point where it is no longer effective to transmit the motion of the input sheave 17 to the output sheave 18 when the control lever 45 is moved to its rear or slow position, it is necessary to make adjustments in the control linkage 16 in order to regain full speed control of the drive system. This is easily accomplished by loosening the cap screw 57, rotating the crank arm 55 with respect to the link 51 to bring the variator sheave 19 to an adjusted position with respect to the control lever 45, and tightening the cap screw 57.

Since the cap screw 57 is located behind the wall 13, it becomes necessary to provide an opening in the wall 13 to allow access to the cap screw 57. However, due to the unique control linkage there need be only a single opening and if positioned properly it need be only large enough to allow insertion of a socket wrench. For example, the proper position for the opening in the wall 13 of the tractor illustrated is determined by the position of the cap screw 57 when the lever 45 is moved to a predetermined forward position and the upper end of the link 49 is in engagement with the upper end of the slot 53. When the control linkage is so positioned the opening in the side wall must allow access to the cap screw 57. By way of example, the predetermined forward position of the lever 45 may be the third notch from the forward end of the quadrant 48. This will allow movement of the lever 45 forwardly of the predetermined position so that the "fast" position of the variator sheave 19 is determined by the engagement of the primary belt 20 in the bottom of its groove in the variator sheave 19. This will prevent loss of control in the upper end of the speed range as the primary belt begins to wear.

With the opening in the side wall positioned as indicated above, there are two modes in which the adjustment procedure can be preformed. In the first mode of adjustment, the cap screw 57 is loosened a sufficient amount that the link 51 will freely rotate with respect to the crank arm 55. Now, by moving the control lever to a position forwardly of the predetermined position and rotating the input sheave 17 a few revolutions, which can be accomplished through the use of the tractor engine, the primary belt 20 will be forced deeper into its groove in the variator sheave and the spring 42 will move the variator sheave 19 rearwardly until the primary belt 20 engages the bottom of its groove in the variator sheave. Then, if the cap screw 57 is not centered in the opening provided in the wall 13 the socket wrench can be inserted through the opening at an angle so as to engage the cap screw 57 and then the wrench can be used to bring the cap screw 57 to a centered position with respect to the opening. The centering of the cap screw 57 puts the variator sheave, lever 45, and the quadrant 48 in the proper relationship with respect to each other. Now by tightening the cap screw 57, the adjustment procedure is completed.

In the second mode of adjustment, the lever 45 is moved to the predetermined forward position and the cap screw 57 loosened only a sufficient amount that there is a small amount of frictional engagement between the link 51 and the crank arm 55 which will allow one to rotate with respect to the other when a small force is applied. Then, by rotating the input sheave a few revolutions through the use of the tractor engine, the primary belt 20 is forced deeper into its groove in the variator sheave 19 and the spring 42 moves the variator sheave rearwardly. As the variator sheave 19 is moved rearwardly, the small frictional engagement between the link 51 and crank arm 55 will hold the upper end of the link 49 in engagement with the upper end of the slot 53, but will allow the crank arm 55 to rotate with respect to the link 51. The variator sheave 19 moves rearwardly until the primary belt 20 engages the bottom of its groove in the variator sheave. When the variator sheave has reached its adjusted position, the cap screw 57 will be centered with respect to the opening in the wall 13 due to the fact that the upper end of the link 49 was kept in engagement with the upper end of the slot 53. Therefore, to complete the adjustment procedure, it is only necessary to tighten the cap screw 57.

I claim:

1. In a variable speed belt drive system including an input sheave, an output sheave, a first rockshaft positioned above and intermediate said input and output sheaves, a crank arm secured to and depending from said rockshaft, a variator sheave positioned between said input and output sheaves and mounted on the free end of said crank arm, a first belt trained around an input sheave and said variator sheave, a second belt trained around said output sheave and said variator sheave, a second rockshaft mounted parallel to said first rockshaft and means to control the movement of said second rockshaft, the improvement comprising: means adjustably connecting said first rockshaft to said second rockshaft to transmit the movements of said second rockshaft to said first rockshaft, said means including a second crank arm secured to said first rockshaft, a first link means rotatably mounted intermediate its ends on said first rockshaft adjacent said second crank arm, means adjustably securing one end of said first link means to the free end of said second crank arm, a third crank arm secured to said second rockshaft, and second link means secured between the free end portion of said third crank arm and the other end of said first link means, whereby movement of said second rockshaft will be transmitted through said third crank arm, said second link, said first link, and said second crank arm to said first crank arm to adjustably position said variator sheave.

2. The drive system as set forth in claim 1 wherein said means adjustably securing one end of said first link means to the free end of said second crank arm includes an elongated opening provided in said second crank arm and having its major dimension positioned generally perpendicular to the longitudinal axis of said second crank arm, a threaded opening in said one end of said first link means, said threaded opening and said elongated opening being positioned an equal distance from said first rockshaft, and a cap screw extending through said elongated opening and threadedly received by said threaded opening whereby tightening of said cap screw will secure said first link means and said second crank arm in fixed relation to each other.

3. The device as set forth in claim 2 wherein said second link means is secured to said third crank arm through a lost motion connection whereby the movement of said first shaft is not entirely limited to the movement of said second shaft.

4. The device as set forth in claim 2 wherein said second and third crank arms extend in opposed directions to each other whereby said shafts will be rotated in the same direction.

5. In the combination of a tractor having a prime mover, a pair of driven wheels, and a variable speed belt drive system operatively disposed and connected between said prime mover and driven wheels, said drive system including an input sheave operatively connected to said prime mover, an output sheave operatively associated with said driven wheels, a variator sheave positioned between said input and output sheaves, a first belt trained around said input and variator sheaves, and a second belt trained around said output and variator sheaves; the improvement comprising: control linkage for said drive system including a first rockshaft positioned above said variator sheave and rotatably journaled on said tractor, a first crank arm secured to and depending from said first shaft, the free end of said first crank arm rotatably carrying said variator sheave, a second rockshaft rotatably journaled on said tractor in parallel relationship to said first shaft, manually operable means secured to said second shaft to control the movement of said second shaft, and means adjustably connecting said first shaft to said second shaft to transmit the movements of said second shaft to said first shaft including a second crank arm secured to said first shaft, first link means rotatably mounted intermediate its ends on said first shaft adjacent said second crank arm, means adjustably securing one end of said first link means to the free end of said second crank arm, a third crank arm secured to said second shaft, and second link means secured between the free ends of said first link and said third crank arm.

6. The combination as set forth in claim 5 wherein said means adjustably securing one end of said first link means to the free end of said second crank arm includes a cap screw extending through an elongated slot provided in said second crank arm and threadedly received by a thread opening provided in said first link means, whereby tightening of said cap screw will secure said first link means and second crank arm in fixed relation to each other and loosening of said cap screw allows relative rotation between said first link means and second crank arm within the limits dictated by said elongated slot, and wherein said tractor further includes a pair of spaced side walls and said first and second shafts are mounted between said side walls, and an opening provided in one of said side walls to allow access to said cap screw for adjusting the relationship between said first link means and said second crank arm.

References Cited
UNITED STATES PATENTS

| | | | |
|---|---|---|---|
| 2,930,246 | 3/1960 | Johnson et al. | 74—230.17 XR |
| 3,015,237 | 1/1962 | Musgrave | 74—230.17 |
| 3,364,766 | 1/1968 | Ramo | 74—230.17 |

FRED C. MATTERN, Jr., Primary Examiner

JAMES A. WONG, Assistant Examiner